United States Patent
Farnham et al.

(10) Patent No.: US 6,538,083 B2
(45) Date of Patent: Mar. 25, 2003

(54) CHAIN TRANSFER AGENTS IN FLUOROOLEFIN POLYMERIZATION

(75) Inventors: William B Farnham, Hockessin, DE (US); Robert C Wheland, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 211 days.

(21) Appl. No.: 09/734,135

(22) Filed: Dec. 11, 2000

(65) Prior Publication Data

US 2002/0032291 A1 Mar. 14, 2002

Related U.S. Application Data

(60) Provisional application No. 60/172,927, filed on Dec. 21, 1999.

(51) Int. Cl.$^7$ ............................ C08F 2/38; C08F 214/18
(52) U.S. Cl. ........................ 526/237; 526/82; 526/206; 526/238; 526/249
(58) Field of Search ................................ 526/237, 206, 526/238, 242, 942, 82

(56) References Cited

U.S. PATENT DOCUMENTS

| | | | |
|---|---|---|---|
| 3,472,829 A | | 10/1969 | Claybaugh et al. |
| 3,755,246 A | | 8/1973 | Trautvetter et al. |
| 3,974,237 A | | 8/1976 | Brumbaugh et al. |
| 4,076,699 A | | 2/1978 | Grimaud et al. |
| 4,760,195 A | * | 7/1988 | Kubo et al. ............... 568/466 |
| 5,455,319 A | | 10/1995 | Bak et al. |

OTHER PUBLICATIONS

R. N. Haszeldine, et al. "Addition of Free Radicals to Unsaturated Systems. Part X. * The Reaction of Hydrogen Bromide with Tetrafluoroethylene and Chlorotrifluoroethylene", J. Chem. Soc. 3747–3751 (1954).

* cited by examiner

*Primary Examiner*—Fred Zitomer

(57) ABSTRACT

This invention concerns a process for the use of hydrogen halides as chain transfer agents in fluoroolefin polymerization.

15 Claims, No Drawings

CHAIN TRANSFER AGENTS IN FLUOROOLEFIN POLYMERIZATION

FIELD OF THE INVENTION

This invention concerns a process for the use of hydrogen halides as chain transfer agents in fluoroolefin polymerization.

TECHNICAL BACKGROUND OF THE INVENTION

Chain transfer agents are often added to fluoroolefin polymerizations to lower molecular weight. Applicants have found hydrogen chloride and hydrogen bromide to be highly active chain transfer agents in fluoroolefin polymerizations when these polymerizations are run in the absence of water, the final polymers showing a unique balance of H and Cl or Br end groups. Previously there have been scattered reports of hydrogen chloride and/or hydrogen bromide being used as chain transfer agents, primarily under coordination (Ziegler) polymerization conditions rather than under the radical polymerization conditions reported here or in the polymerization of styrenes.

U.S. Pat. No. 3,472,829 discloses a Ziegler-catalysed process for the polymerization of hydrocarbon alpha-olefins such as ethylene and propylene. Hydrogen chloride is included in a listing of possible chain transfer agents.

U.S. Pat. No. 3,974,237 discloses a Ziegler-catalyzed process for the copolymerization of gaseous hydrocarbon alpha-olefins such as ethylene and propylene to form a block olefinic copolymer. Hydrogen chloride is included in a listing of possible chain transfer agents.

U.S. Pat. No. 3,755,246 discloses a process for the aqueous phase polymerization of vinyl fluoride in the presence of at least one iodine containing compound. The use of hydroiodic acid is disclosed.

U.S. Pat. No. 4,076,699 discloses a process for the polymerization of styrene and substituted styrenes and includes hydrogen chloride in a listing of possible chain transfer agents.

U.S. Pat. No. 5,455,319 discloses the use of iodine-containing chain transfer agents, wherein the iodine is bonded to a primary carbon atom, in the polymerization of a vinyl halide such as vinyl chloride, especially under aqueous emulsion polymerization conditions.

R. N. Hazeldine et al., *J Chem. Soc.* 3747 (1954) describe the photoinitiated reaction of hydrogen bromide with tetrafluoroethylene to yield $Br(CF_2CF_2)_nH$, where the product was obtained in yields of (based on HBr) of 66% for n=1, 12% for n=2 and 0.5% for n=3. Similarily, the photoinitiated reaction of HBr with 1-chloro, 1,2,2-trifluoroethylene gave an 85% yield of 1-bromo-2-chloro-1,1,2-trifluoroethane, 4% of 1-bromo-2,4-dichloro-1, 1,2,3,3,4-hexafluorobutane and 0.5% of 1-bromo-2,4,6-trichloro-1,1,2,3,3,4,5,5,6-nonafluorohexane.

SUMMARY OF THE INVENTION

This invention provides a nonaqueous process for the preparation of polymers, copolymers, oligomers and telomers of one or more vinyl monomers wherein at least one of the vinyl monomers is partially or fully fluorinated comprising the steps of: a) contacting said vinyl monomer with a HX chain transfer agent, wherein, X is Cl or Br, to form a nonaqueous polymerization reaction mass; b) simultaneously or subsequently further contacting said polymerization reaction mass with a fluoroolefin polymerization initiator; and c) reacting said vinyl monomer to yield said polymer, copolymer, oligomer or telomer.

This invention further provides the products of said process.

DETAILED DESCRIPTION OF THE INVENTION

This invention provides a nonaqueous process for the preparation of polymers, copolymers, oligomers and telomers of one or more vinyl monomers wherein at least one of the vinyl monomers is partially or fully fluorinated comprising the steps of: a) contacting said vinyl monomer with a HX chain transfer agent, wherein, X is Cl or Br, to form a non-aqueous polymerization reaction mass; b) simultaneously or subsequently further contacting said polymerization reaction mass with a fluoroolefin polymerization initiator; and c) reacting said vinyl monomer to yield said polymer, copolymer, oligomer or telomer.

The vinyl monomers useful in the present invention are those perfluorinated and partially fluorinated monomers subject to radical homopolymerization and copolymerization. Examples include tetrafluoroethylene (TFE), hexafluoropropylene (HFP), trifluoroethylene, chlorotrifluoroethylene, hexafluoroisobutylene $[(CF_3)_2C=CH_2]$, vinylidene fluoride ($VF_2$), vinyl fluoride, perfluoroalkyl vinyl ethers, including perfluoromethyl vinyl ether (PMVE), perfluoroethyl vinyl ether and perfluoropropyl vinyl ether (PPVE), 4,5-difluoro-2,2-bis(trifluoromethyl)-1,3-dioxole (PDD), perfluoro (2-methylene-4-methyl-1,3-dioxolane) (PMD) and $CF_2=CFOCF_2CF(CF_3)OCF_2CF_2X$, wherein $X=CH_2OH$ (EVEOH), $—CH_2OPO_3H_2$ ($EVEOPO_3H_2$), or $—SO_2F$ (PSEPVE). This latter sulfonyl fluoride-bearing olefin is a preferred case of the more generally stated monomer $CF_2=CF(OCF_2CFR)_aOCF_2(CFR')_bSO_2F$, wherein R and R' are independently selected from the group consisting of F, Cl and a perfluorinated alkyl group having 1 to 10 carbon atoms, a is 0,1 or 2 and b is 0 to 6.

Maleic anhydride may be used as a comonomer in the presence of a fluorine containing monomer.

Chain transfer agents useful in the process of the present invention include hydrogen halides: HCl and HBr. HCl is the preferred preferred chain transfer agent.

The amount of HX chain transfer agent used may be from 0.0001 to 50 wt % of total monomers loaded. Chain transfer agent in the amount of from 0.001 to 30 wt % of monomers is preferred. Most preferred is an amount of from 0.002 to 20 wt % of monomers. The amount of chain transfer agent may be adjusted, as is known to those skilled in the art, to allow the desired molecular weight product to be obtained.

The reaction may be carried out in neat monomer, i.e., monomer containing the HX chain transfer agent and the polymerization initiator—which may be supplied as a solution in a non-reactive solvent. For ease of operation, the process may be carried out in a solvent or diluent, for example carbon dioxide, supercritical or liquid, fluorocarbons, for example, $CCl_2FCF_2Cl$, or hydrofluorocarbons, for example $CF_3CFHCFHCF_2CF_3$. Most preferred is the use of supercritical or liquid carbon dioxide.

Temperatures in the range of from −20° C. to 300° C. may be employed. A preferred temperature range is from 0 to 200° C. Most preferred is a temperature range of from 10 to 50° C.

Polymerization intitators employed are those typically used for fluoroolefin polymerizations that are stable in the presence of hydrogen halides. Preferred initiators are perfluorinated diacylperoxides, $NF_3$ and hexafluoropropylene oxide (HFPO) dimer peroxide, $[CF_3CF_2CF_2OCF(CF_3)C=OO]_2$. HFPO dimer peroxide is the most preferred initiator.

This invention further provides the products of the process of the present invention, partially or fully fluorinated polymers and oligomers, as compositions of matter. These products are formed by radical reactions of the type shown below (using TFE as the monomer) in which X• represents a halogen radical such as bromine or chlorine radicals and in which I• represents an initiating radical such as $CF_3CF_2CF_2OCF(CF_3)$• from HFPO dimer peroxide.

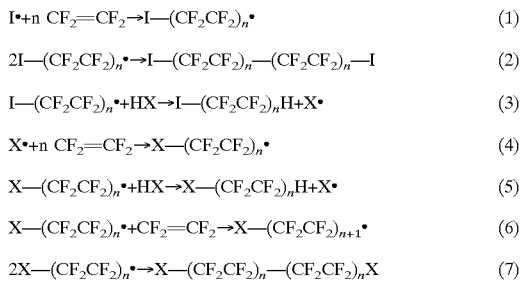

The higher the concentration of HX, the more likely reactions (4), (5), and (6) are to cycle repeatedly, making the product of equation (5) the predominant species in the reaction mixture and the numbers of H and X ends approach equality. The lower the concentration of HX, the greater the extent to which ends will be determined by the initiation step, equation (1), and the termination reactions, equations (2) and (7), thus increasing the fraction of initiator derived ends, lowering the fraction of H ends, and increasing the ratio of X ends to hydrogen ends.

Thus, the compositions of the present invention are partially or fully fluorinated polymers and oligomers of the structure X-(monomer)$_n$-H. The polymer chains have on average 0.6 to 1.0 H end groups and 0.6 to 1.0 X end groups, wherein X is chorine and/or bromine. More preferably chains average 0.9 to 1.0 H end groups and 0.9 to 1.0 X end groups. Most preferably chains average 0.95 to 1.0 H end groups and 0.95 to 1.0 X end groups. The balance of any ends not H or X are ends derived from initiator and any ends derived from chain transfer/radical abstraction with other components in the reaction mixture. Overall there are a total of two end groups per chain consisting of the sum of the H ends, the X ends, ends derived from initiator, and any ends derived from chain transfer/radical abstraction with other components in the reaction mixture.

An alternate representation of the compositions of the present invention is $X_{1-y}$—$Y_y$(monomer)$_n$-$H_{1-z}Y_z$, wherein Y represents the non-X and non-H end groups, wherein Y is made up of initiator and any ends derived from chain transfer/radical abstraction with other components in the reaction mixture, and the values of y and z are, independently, between 0 and 0.4, preferably between 0 and 0.1 and most preferably between 0 and 0.05.

For purposes of the above discussion, polymer products are discussed in terms of linear polymers. As known to one skilled in the art, small amounts of branched polymers may be formed due to the presence of small amounts of impurities or branch-forming reactions. Compositions containing minor amounts of said branched polymers are meant to be within the scope of this invention.

In the formula X-(monomer)$_n$-H, preferred monomers include tetrafluoroethylene (TFE), hexafluoropropylene (HFP), trifluoroethylene, chlorotrifluoroethylene, hexafluoroisobutylene $((CF_3)_2C=CH_2)$, vinylidene fluoride $(VF_2)$, vinyl fluoride, perfluoroalkyl vinyl ethers, including perfluoromethyl vinyl ether (PMVE), perfluoroethyl vinyl ether and perfluoropropyl vinyl ether (PPVE), 4,5-difluoro-2,2-bis(trifluoromethyl)-1,3-dioxole (PDD), perfluoro(2-methylene-4-methyl-1,3-dioxolane) (PMD), $CF_2=CFOCF_2CF(CF_3)OCF_2CF_2X$, wherein $X=CH_2OH$ (EVEOH), —$CH_2OPO_3H_2$ (EVEOPO$_3$H$_2$), or —$SO_2F$ (PSEPVE), $CF_2=CF(OCF_2CFR)_aO(CF_2)_b(CFR')_cSO_2F$, wherein R and R' are independently selected from the group consisting of F, Cl and a perfluorinated alkyl group having 1 to 10 carbon atoms, a is 0, 1 or 2, b is 0 to 6 and c is 0 or 1; and, as a comonomer with one or more fluorinated monomers, maleic anhydride.

Copolymers of the present invention bearing pendant sulfonyl fluoride groups may be converted by modification of known hydrolysis methods to ionomers. The counter ion of the hydrolyzed sulfonyl chloride group may vary widely as is known in the art and may be selected from alkali metals, for example sodium or lithium.

In the formula X-(monomer)$_n$-H, values of n may be in the range of about 5 to 20,000, preferably 20 to 1000, most preferably 25–100.

The compositions of the present invention are useful as lubricants and as synthetic precursors to surfactants, macromonomers and polyelectrolytes.

EXAMPLES

In the examples that follow, polymer compositions were determined by IR, NMR, or combustion analysis. Fluorine content determined by combustion analysis becomes increasingly inaccurate with increasing extent of fluorination and is not reported here for substantially perfluorinated polymers.

Comparative Example 1

TFE/PPVE Polymerization in Carbon Dioxide in Absence of Chain Transfer Agent to Yield High MW Polymer A 400 ml stainless steel autoclave prechilled to <−20° C. was loaded with 5 ml of ~0.16 M HFPO dimer peroxide in $CF_3CF_2CF_2OCFHCF_3$ solvent, 50 g TFE, 5 g perfluoropropyl vinyl ether, and 150 g carbon dioxide. Shaking overnight at room temperature gave, after vacuum pump devolatilization, 37 g of white powder. When 2 g were loaded in a melt index apparatus preheated to 372° C. and a 5 kg weight applied, no polymer extruded. Composition by infrared was 95.6 wt % TFE and 4.4 wt % perfluoropropyl vinyl ether.

Comparative Example 2

TFE/PPVE Polymerization in Carbon Dioxide with Slight Chain Transfer by CHCl$_3$ A 400 ml stainless steel autoclave prechilled to <−20° C. was loaded with 5 ml of ~0.16 M HFPO dimer peroxide in $CF_3CF_2CF_2OCFHCF_3$ solvent, 1 ml of chloroform dissolved in 5 ml of $CF_3CF_2CF_2OCFHCF_3$, 50 g TFE, 5 g perfluoropropyl vinyl ether, and 150 g carbon dioxide. Shaking overnight at room temperature gave, after vacuum pump devolatilization, 47 g of white powder. When 2 g were loaded in a melt index apparatus preheated to 372° C. and a 5 kg weight applied, the polymer extruded at 0.3 g/min. Composition by infrared was 96.1 wt % TFE and 3.9 wt % perfluoropropyl vinyl ether.

Comparative Example 3

TFE Polymerization in Carbon Dioxide in the Absence of Chain Transfer Agent to Yield High MW Polymer A 400 ml stainless steel autoclave prechilled to <−20° C. was loaded with 5 ml of ~0.16 M HFPO dimer peroxide in $CF_3CFHCFHCF_2CF_3$ solvent, 50 g TFE, and 150 g carbon dioxide. Shaking overnight at room temperature gave, after vacuum pump devolatilization, 46 g of white powder. When 2 g were loaded in a melt index apparatus preheated to 372° C. and a 15 kg weight applied, no polymer extruded. The polymer melted at 327° C. (DSC, second heat, 10° C./min, $N_2$) and 10% weight loss occurred at about 520° C. (TGA, 10° C./min, $N_2$).

Comparative Example 4

TFE Polymerization in Water with No Significant Chain Transfer by Aqueous HCl A 400 ml Hastelloy™ autoclave prechilled to <−20° C. was loaded with 0.1 g of ammonium persulfate, ~0.25 g of $C_6F_{13}CH_2CH_2SO_3H$ surfactant in 101 ml of water, 5 ml of concentrated aqueous hydrochloric acid, and 50 g TFE. The contents of the autoclave were shaken as the autoclave was heated for ~2 hours at 50° C., 70° C., 90° C., and finally 110° C. The resulting solids were filtered and washed 3× with $H_2O$ and then 3× with methanol in a Waring blender. Drying under pump vacuum overnight gave 47 g of poly (tetrafluoroethylene). When 2 g were loaded in a melt index apparatus preheated to 372° C. and a 15 kg weight applied, no polymer extruded. The polymer melted at 329° C. (DSC, second heat, 10° C./min, $N_2$) and 10% weight loss occurred at about 540° C. (TGA, 10° C./min, $N_2$).

Comparative Example 5

TFE Polymerization at ~50–200° C. with Relatively Little Chain Transfer in Absence of HCl A 400 ml stainless steel autoclave prechilled to <−20° C. was loaded with 1 g $NF_3$, 25 g TFE, and 75 g carbon dioxide. The tube was shaken as it was heated for approximately 2 hours at 100° C., 2 hours at 150° C., 2 hours at 175° C., and 2 hours at 200° C. A slight pressure drop, signaling the onset of polymerization, was first observed at 155° C. This gave white PTFE powder which weighed 23 g after five days of drying in a 75° C. vacuum oven. When 2 g were loaded in a melt index apparatus preheated to 334° C. and a 5 kg weight applied, opaque white polymer extruded at 0.1 g/min. The polymer melted at 328° C. (DSC, second heat, 10° C./min, $N_2$) and 10% weight loss was observed at 520° C. (TGA, 10° C./min, $N_2$).

Example 1

TFE/PPVE Polymerization in Carbon Dioxide with Variation in Amount of HCl Chain Transfer Agent A. (TFE+PPVE)/HCl Ratio of 55

A 400 ml Hastelloy autoclave prechilled to <−20° C. was loaded with 5 ml of ~0.16 M HFPO dimer peroxide in $CF_3CF_2CF_2OCFHCF_3$ solvent, ~1 g of HCl gas, 50 g TFE, 5 g perfluoropropyl vinyl ether, and 150 g carbon dioxide. Shaking overnight at room temperature gave, after vacuum pump devolatilization, 32 g of white powder. When 2 g were loaded in a melt index apparatus preheated to 372° C., the polymer melted through without the application of any pressure. Composition by infrared was 96.7 wt % TFE and 3.3 wt % perfluoropropyl vinyl ether. A sample of TFE/perfluoropropyl vinyl ether copolymer made under similar conditions in the absence of hydrogen chloride did not extrude at all (Comparative Example 1).

B. (TFE+PPVE)/HCl Ratio of 550

A 400 ml Hastelloy autoclave prechilled to <−20° C. was loaded with 5 ml of ~0.16 M HFPO dimer peroxide in $CF_3CF_2CF_2OCFHCF_3$ solvent, ~0.1 g of HCl gas, 50 g TFE, 5 g perfluoropropyl vinyl ether, and 150 g carbon dioxide. Shaking overnight at room temperature gave, after vacuum pump devolatilization, 44 g of white powder. When 2 g were loaded in a melt index apparatus preheated to 305° C., the polymer melted through at 0.04 g/min with the application of a 5 kg weight. Composition by infrared was 96.0 wt % TFE and 4.0 wt % perfluoropropyl vinyl ether. A sample of TFE/perfluoropropyl vinyl ether copolymer made under similar conditions in the absence of hydrogen chloride did not extrude at all even at 372° C. (Comparative Example 1).

Example 2

TFE Polymerization in Carbon Dioxide with Variation in Amount of HCl Chain Transfer Agent A. TFE/HCl Ratio of 50

A 400 ml Hastelloy autoclave prechilled to <−20° C. was loaded with 5 ml of ~0.16 M HFPO dimer peroxide in $CF_3CFHCFHCF_2CF_3$ solvent, 50 g TFE, ~1 g hydrogen chloride gas, and 150 g carbon dioxide. Shaking overnight at room temperature gave fine white dust. After drying overnight under pump vacuum, this dust weighed 49 g. The polymer melted at 315° C. (DSC, second heat, 10° C./min, $N_2$). Fluorine NMR run at 300° C. found 96.74 moles of TFE (−68, −119 to −121, −122.4, −128.4, and −138.0 ppm) for every 1.57 moles of —$CF_2Cl$ ends (−68 ppm), 1.56 moles of —$CF_2H$ ends (−138 ppm), and 0.13 moles of dimer peroxide initiator ends [$CF_3CF_2CF_2OCF(CF_3)$—, ~−77 to −83 ppm) making for a calculated molecular weight of 6000. Combustion analysis found 0.57 wt % Cl versus 0.58 wt % Cl calculated for $Cl_{0.97}(CF_2CF_2)_{59.0}(H)_{0.95}[CF(CF_3)OCF_2CF_2CF_3]_{0.08}$. When 2 g were loaded in a melt index apparatus preheated to 372° C., the polymer started melting through as white balls before the application of any pressure. A sample of PTFE made under identical conditions in the absence of hydrogen chloride did not extrude at all at 372° C. (Comparative Example 3).

B. TFE/HCl Ratio of 5

A 400 ml Hastelloy autoclave prechilled to <−20° C. was loaded with 5 ml of ~0.15 M HFPO dimer peroxide in $CF_3CFHCFHCF_2CF_3$ solvent, 50 g TFE, 10 g hydrogen chloride gas, and 150 g carbon dioxide. Shaking overnight at room temperature gave damp lumps. After drying overnight under pump vacuum, these lumps weighed 35 g. The polymer has a complicated DSC with first melting at 287° C. (second heat, 10° C./min, $N_2$). Fluorine NMR run at 300° C. found 87.08 moles of TFE (−68.5, −119 to −121, −122.6, −128.6, −138.2, and −138.3 ppm) for every 6.48 moles of —$CF_2Cl$ ends (−68.5 ppm), 6.38 moles of —$CF_2H$ ends (−138.2 and −138.3 ppm), and 0.05 moles of dimer peroxide initiator ends [$CF_3CF_2CF_2OCF(CF_3)$—, ~−77 to −83 ppm) making for a calculated molecular weight of 1400. Combustion analysis found 2.68 wt % Cl versus 2.56% Cl calculated for $Cl_{1.00}(CF_2CF_2)_{13.5}(H)_{0.99}[CF(CF_3)OCF_2CF_2CF_3]_{0.01}$. A sample of PTE made under identical conditions in the absence of hydrogen chloride did not extrude at all at 372° C. (Comparative Example 3).

Example 3

TFE Polymerization in Carbon Dioxide, Moderate Amount of HCl Chain Transfer Agent Variation in Amount of Initiator A. Relatively Low Initiator Concentration A 400 ml Hastelloy autoclave prechilled to <−20° C. was loaded with 1 ml of ~0.16 M HFPO dimer peroxide in $CF_3CFHCFHCF_2CF_3$ solvent, 4 ml of $CF_3CFHCFHCF_2CF_3$ solvent, 50 g TFE, ~1 g hydrogen chloride gas, and 150 g carbon dioxide. Shaking overnight at room temperature gave fine white dust. After drying overnight under pump vacuum, this dust weighed 21 g. The polymer melted at 320° C. (DSC, second heat, 10° C./min, $N_2$) and 10% weight loss was observed at 420° C. (TGA, 10° C./min, $N_2$). Fluorine NMR run at 300° C. found 98.11 moles of TFE (−67, −115 to −122, −127, and −137 ppm) for every 0.94 moles of —$CF_2Cl$ ends (−67 ppm), 0.91 moles of —$CF_2H$ ends (−137 ppm), and 0.04 moles of dimer peroxide initiator ends [$CF_3CF_2CF_2OCF(CF_3)$—, ~−77 to −83 ppm) making for a calculated molecular weight of 10,000. When 2 g were loaded in a melt index apparatus preheated to 305° C., the polymer melted through at 1 g/min with the application of a 2.5 kg weight. A sample of PTFE made under identical conditions in the absence of hydrogen chloride did not extrude at all at 372° C. (Comparative Example 3).

B. Intermediate Initiator Concentration

A 400 ml Hastelloy autoclave prechilled to <−20° C. was loaded with 2.5 ml of ~0.16 M HFPO dimer peroxide in $CF_3CFHCFHCF_2CF_3$ solvent, 2.5 ml of $CF_3CFHCFHCF_2CF_3$ solvent, 50 g TFE, ~1 g hydrogen chloride gas, and 150 g carbon dioxide. Shaking overnight at room temperature gave fine white dust. After drying ovenight under pump vacuum, this dust weighed 31 g. The polymer melted at 319° C. (DSC, second heat, 10° C./min, $N_2$) and 10% weight loss was observed at 420° C. (TGA, 10° C./min, $N_2$). Fluorine NMR run at 320° C. found 97.81 moles of TFE (−69, −115 to −123, −129, and −138 ppm) for every 1.07 moles of —$CF_2Cl$ ends (−69 ppm), 1.05 moles of —$CF_2H$ ends (−138 ppm), and 0.07 moles of dimer peroxide initiator ends [$CF_3CF_2CF_2OCF(CF_3)$—, ~−77 to −83 ppm) making for a calculated molecular weight of 9000. When 2 g were loaded in a melt index apparatus preheated to 305° C. and a 2.5 kg weight applied, the polymer melted through too rapidly for accurate measurement with the application of a 2.5 kg weight. A sample of PTFE made under identical conditions in the absence of hydrogen chloride did not extrude at all at 372° C. (Comparative Example 3).

Example 2A above illustrates this same level of chain transfer agent with a relatively high initiator concentration.

Example 4

TFE Polymerization in Absence of Solvent with Extensive Chain Transfer by HCl A 400 ml Hastelloy autoclave prechilled to <−20° C. was loaded with 5 ml of ~0.16 M HFPO dimer peroxide in $CF_3CFHCFHCF_2CF_3$, 50 g TFE, and 10 g hydrogen chloride gas. Shaking overnight at room temperature gave damp lumps. After drying five days under pump vacuum, these lumps weighed 27 g. The polymer melted at 286° C. (DSC, second heat, 10° C./min, $N_2$) and 10% weight loss was observed at 160° C. (TGA, 10° C./min, $N_2$). Fluorine NMR run at 300° C. found 90.00 moles of TFE (−67.9, −115 to −121, −122.0, −128.0, −137.7 ppm) for every 5.04 moles of —$CF_2Cl$ ends (−67.9 ppm), 4.91 moles of —$CF_2H$ ends (−137.7 ppm), and 0.06 moles of dimer peroxide initiator ends [$CF_3CF_2CF_2OCF(CF_3)$—, ~−77 to −83 ppm) making for a calculated molecular weight of 1800.

Example 5

TFE Polymerization in Carbon Dioxide with HCl Chain Transfer Agent at 145–150° C.

A 400 ml Hastelloy autoclave was loaded with 1 g hydrogen chloride gas, 75 g of carbon dioxide, 1 g of $NF_3$ initiator, and 25 g of TFE. The autoclave was heated for ~2 hours at 100° C., 2 hours at 150° C., 2 hours at 175° C., and 2 hours at 200° C. Pressure reached a maximum of 1900 psi at 145° C. and then decreased to 1752 psi over the ~2 hour period at 150° C. After that pressure once again increased with increasing temperature. From this one concludes that polymerization occurred largely from 145 to 150° C. After drying overnight under pump vacuum, the white polymeric product weighed 20 g. Fluorine NMR run at 320° C. found 93.07 moles of TFE (−68, −115 to −121, −122, −128, −138 ppm) for every 3.46 moles of —$CF_2Cl$ ends (−68 ppm), 3.38 moles of —$CF_2H$ ends (−138 ppm), 0.048 moles of —F ends (−82 ppm), and possibly 0.038 moles of —$NF_2$ ends (30 ppm) making for a calculated molecular weight of 2700. When 2 g were loaded in a melt index apparatus preheated to 270° C., polymer melted through before the application of any pressure. The polymer melted at 288° C. in the DSC (second heat, 10° C./min, $N_2$) and showed a 10% weight loss at 180° C. in TGA experiments (10° C./min, $N_2$).

A sample of PTFE made under comparable conditions in the absence of HCl (Comparative Example 5) extruded at 334° C. at 0.01 g/min with a 5 kg weight in melt index experiments, melted at 328° C. in DSC experiments, and showed a 10% weight loss temperature of 520° C. in TGA experiments.

Example 6

TFE Polymerization in $CCl_2FCF_2Cl$ with HCl Chain Transfer Agent

A 400 ml Hastelloy autoclave prechilled to <−20° C. was loaded with 5 ml of ~0.16 M HFPO dimer peroxide in $CF_3CFHCFHCF_2CF_3$ solvent, 50 g TFE, ~1 g hydrogen chloride gas, and 150 ml $CCl_2FCF_2Cl$. Shaking overnight at room temperature gave a fine white dust. After drying overnight under pump vacuum, this dust weighed 27 g. Combustion analysis found 0.21 wt % Cl. DSC found a melting point of 323° C. (second heat, 10° C./min, $N_2$). When 2 g were loaded in a melt index apparatus preheated to 372° C., polymer melted through as white balls and fine needles before the application of any pressure. A sample of PTFE made under identical conditions in the absence of hydrogen chloride did not extrude at all at 372° C. (Comparative Example 3).

Example 7

TFE Polymerization in Carbon Dioxide with HBr Chain Transfer Agent

A 400 ml Hastelloy autoclave prechilled to <−20° C. was loaded with 5 ml of ~0.17 M HFPO dimer peroxide in $CF_3CFHCFHCF_2CF_3$ solvent, 50 g TFE, ~1.6 g hydrogen bromide gas, and 150 g carbon dioxide. Shaking overnight at room temperature gave fine white dust. After drying for 24 hours in a 75° C. vacuum oven, this dust weighed 43 g. The polymer melted at 328° C. (DSC, second heat, 10° C./min, $N_2$). Fluorine NMR run at 320° C. on the melt found 99.48 moles of TFE (−62, ~−97 to −135, and −136 ppm) for every 0.20 moles of —$CF_2Br$ ends (−62 ppm), 0.18 moles of —$CF_2H$ ends (−136 ppm), and 0.14 moles of dimer peroxide initiator ends [$CF_3CF_2CF_2OCF(CF_3)$—, ~−78 to −81 ppm) making for a calculated molecular weight of 38,000. X-ray fluorescence found 0.102 wt % Br and combustion analysis 0.22 wt % Br versus 0.16 wt % Br expected from the NMR analysis.

Example 8

TFE Polymerization in Carbon Dioxide with HBr Chain Transfer Agent

A 400 ml Hastelloy autoclave prechilled to <−20° C. was loaded with 5 ml of ~0.17 M HFPO dimer peroxide in $CF_3CFHCFHCF_2CF_3$ solvent, 50 g TFE, 10 g hydrogen bromide gas, and 150 g carbon dioxide. Shaking overnight at room temperature gave fine solid white clumps. After for 24 hours in a 75° C. vacuum oven, the solid weighed 21 g. The polymer melted at 326° C. (DSC, second heat, 10° C./min, $N_2$). Fluorine NMR run at 320° C. on the melt found 99.10 moles of TFE (−61, ~−105 to −135, and −136 ppm) for every 0.30 moles of —$CF_2Br$ ends (−61 ppm), 0.30 moles of —$CF_2H$ ends (−136 ppm), and 0.30 moles of dimer peroxide initiator ends [$CF_3CF_2CF_2OCF(CF_3)$—, ~−78 to −81 ppm) making for a calculated molecular weight of 22,000. X-ray fluorescence found 0.121 wt % Br and combustion analysis 0.21 wt % Br versus 0.24 wt % Br expected from the NMR analysis.

Example 9

TFE/Maleic Anhydride Copolymerization in Carbon Dioxide with HCl Chain Transfer Agent A 400 ml Hastelloy autoclave prechilled to <−20° C. was loaded with 0.5 g of maleic anhydride, 5 ml of ~0.16 M HFPO dimer peroxide in $CF_3CFHCFHCF_2CF_3$ solvent, 50 g TFE, ~1 g hydrogen chloride gas, and 150 g carbon dioxide. Shaking overnight at room temperature gave white lumps and dust. After drying overnight at 85° C. under vacuum, the polymer weighed 14 g. The polymer melted at 293° C. (DSC, second heat, 10° C./min, $N_2$). Combustion analysis found 0.24 wt % H and 0.35% Cl versus 0.23 wt % H and 0.35 wt % Cl calculated for $H(C_2F_4)_{90}(C_4H_2O_3)_{11}Cl$ with a molecular weight of ~10,000.

Example 10

TFE/$CF_2$=$CFOCF_2CF(CF_3)OCF_2CF_2CH_2OPO_3H_2$ Copolymerization in Carbon Dioxide with HCl Chain Transfer Agent A 400 ml Hastelloy autoclave prechilled to <−20° C. was loaded with 5 g of $CF_2$=$CFOCF_2CF(CF_3)OCF_2CF_2CH_2OPO_3H_2$ (EVEOPO$_3$H$_2$), 5 ml of ~0.18 M HFPO dimer peroxide in $CF_3CFHCFHCF_2CF_3$ solvent, 50 g TFE, ~1 g hydrogen chloride gas, and 150 g carbon dioxide. Shaking overnight at room temperature gave white dust. After drying ovenight at 70° C. under vacuum, the white dusty polymer weighed 40 g. In DSC experiments the polymer showed a Tg at 160° C. and melted at 311° C. (DSC, second heat, 10° C./min, $N_2$). In TGA experiments under $N_2$ at 10° C./min, weight loss starts at about 120° C. and reaches 7.5 wt % at 400° C. Fluorine NMR run at 300° C. found 96.16 moles of TFE for every 1.12 moles of —$CF_2Cl$ ends, 0.86 moles of —$CF_2H$ ends, 0.40 moles of dimer peroxide initiator ends [$CF_3CF_2CF_2OCF(CF_3)$—], and 1.46 moles of $CF_2$=$CFOCF_2CF(CF_3)OCF_2CF_2CH_2OPO_3H_2$ making for an approximate structure of $H_{0.72}$[$CF_3CF_2CF_2OCF(CF_3)$—]$_{0.34}$($CF_2CF_2$)$_{81}$ (EVEPO$_3$H$_2$)$_{1.2}$Cl$_{0.94}$ and a calculated molecular weight of ~9000. Combustion analysis found 0.53 wt % P which corresponds to about 1.9 mole percent of the EVEOPO$_3$H monomer assuming a structure of [$H(C_2F_4)_{106}$ $(C_8F_{13}PO_6H_4)_2$Cl. Considering that the NMR sample turned black at 300° C. and that 0.53 wt % P is pushing the limits of experimental error, the NMR and combustion analysis results agree remarkably well.

Example 11

TFE/$CF_2$=$CFOCF_2CF(CF_3)OCF_2CF_2SO_2F$ Copolymerization in Carbon Dioxide with HCl Chain Transfer Agent A 400 ml Hastelloy autoclave prechilled to <−20° C. was loaded with 5 g of $CF_2$=$CFOCF_2CF(CF_3)OCF_2CF_2SO_2F$, 5 ml of ~0.16 M HFPO dimer peroxide in $CF_3CFHCFHCF_2CF_3$ solvent, 50 g TFE, ~1 g hydrogen chloride gas, and 150 g carbon dioxide. Shaking overnight at room temperature gave white dust. After drying overnight at 85° C. under vacuum, the white dusty polymer weighed 42 g. The polymer melted at 307° C. (DSC, second heat, 10° C./min, $N_2$). Combustion analysis found 0.71 wt % S and 0.41% Cl versus 0.72% S and 0.41% Cl calculated for [$H(C_2F_4)_{80}(C_7F_{14}SO_4)_2$ Cl of 8929 molecular weight.

Example 12

TFE/Vinylidene Fluoride Copolymerization in Carbon Dioxide with HCl Chain Transfer Agent A. (TFE+VF2)/HCl Ratio of 114

A 400 ml Hastelloy autoclave prechilled to <−20° C. was loaded with 5 ml of ~0.17 M HFPO dimer peroxide in $CF_3CFHCFHCF_2CF_3$ solvent, 50 g TFE, 64 g of vinylidene fluoride, ~1 g hydrogen chloride gas, and 150 g carbon dioxide. Shaking overnight at room temperature gave white dust. After drying overnight at 75° C. under vacuum, this dust weighed 50 g. The polymer melted at 137° C. (DSC, second heat, 10° C./min, $N_2$). Combustion analysis was consistent with a polymer of molecular weight (approx.) 500.

Found: 30.34% C, 1.58% H, 1.15% Cl, 67.29% F Calc H(TFE)$_{15}$(VF2)$_{22}$Cl 30.18% C, 1.54% H, 1.20% Cl, 67.08% F B. (TFE+VF2)/HCl Ratio of 11.4

A 400 ml Hastelloy autoclave prechilled to <−20° C. was loaded with 5 ml of ~0.17 M HFPO dimer peroxide in $CF_3CFHCFHCF_2CF_3$ solvent, 50 g TFE, 64 g of vinylidene fluoride, ~10 g hydrogen chloride gas, and 150 g carbon dioxide. Shaking overnight at room temperature gave white wax which weighed 90 g after drying ovenight at 75° C. under vacuum. A DSC showed melting transitions at both 80 and 234° C. (second heat, 10° C./min, $N_2$). A 0.1 g sample gave a clear, colorless solution in 5 ml of acetone. Combustion analysis was consistent with an oligomer of molecular weight ~800.

Found: 29.27% C, 1.54% H, 4.29% Cl, 63.75% F Calc H(TFE) (VF2)$_6$Cl 29.27% C, 1.60% H, 4.32% Cl, 64.81% F Example 13

TFE/$CF_2$=$CFOCF_2CF(CF_3)OCF_2CF_2CH_2OH$ Copolymerization in Carbon Dioxide with HCl Chain Transfer Agent A 400 ml Hastelloy autoclave prechilled to <−20° C. was loaded with 4.81 g of $CF_2$=$CFOCF_2CF(CF_3)$ OCF$_2$CF$_2$CH$_2$OH dissolved in 5 ml CF$_3$CFHCFHCF$_2$CF$_3$, 5 ml of ~0.16 M HFPO dimer peroxide in CF$_3$CFHCFHCF$_2$CF$_3$ solvent, 50 g TFE, ~1 g hydrogen chloride gas, and 150 g carbon dioxide. Shaking overnight at room temperature gave white chunks. After drying about 49 hours at 75° C. under vacuum, the white dusty polymer weighed 38 g. The polymer melted at 307° C. (DSC, second heat, 10° C./min, N$_2$). Combustion analysis was consistent with a polymer of ~5700 molecular weight.

Found: 23.73% C, 0.43% H, and 0.62% Cl Calc [H(C$_2$F$_4$)$_{29}$(C$_8$F$_{13}$H$_3$O$_3$)$_7$Cl: 24.04% C, 0.39% H, and 0.62% Cl

Example 14

TFE/Vinylidene Fluoride Copolymerization in Carbon Dioxide with HBr Chain Transfer Agent A 400 ml Hastelloy autoclave prechilled to <−20° C. was loaded with 5 ml of ~0.17 M HFPO dimer peroxide in CF$_3$CFHCFHCF$_2$CF$_3$ solvent, 50 g TFE, 64 g of vinylidene fluoride, ~10 g hydrogen bromide gas, and 150 g carbon dioxide. Shaking overnight at room temperature gave white solid which weighed 41 g after drying 18 hours at 75° C. under vacuum. Combustion analysis was consistent with a molecular weight ~49,000.

Found: 31.94% C, 1.81% H, 0.17% Br, 65.92% F Calc H(TFE)$_{200}$(VF2)$_{450}$Br 31.93% C, 1.86% H, 0.16% Br, 66.05% F

Example 15

Vinylidene fluoride/CF$_2$=CFOCF$_2$CF(CF$_3$)OCF$_2$CF$_2$SO$_2$F Cotelomerization in Carbon Dioxide with HCl Chain Transfer Agent to Yield Low MW Telomer A 400 mL Hastelloy autoclave prechilled to <−20° C. was charged with PSEPVE (150 g) and 15 mL of 0.17 M HFPO dimer peroxide. The vessel was closed, evacuated, then further charged with vinylidene fluoride (64 g), HCl gas (1 g), and CO$_2$ (150 g), and shaken at room temperature for 18 hr. Excess pressure was released and the viscous residue was analyzed by $^{19}$F NMR. Conversion of PSEPVE to copolymer was ca. 60%. Residual monomer was removed under vacuum (0.5 mm) using temperatures up to 90° C. to provide 120 g of thick, greasy copolymer. $^{19}$F NMR (acetone-d6): +45.5 (s, SO$_2$F), −51.0 and −51.35 (equal intensity m's, a=0.079, assigned to CF$_2$Cl end groups), −77.5 to −80 (m, a=7.00), −91.0 to −97.0 (m, a=3.856), −99.0 and −99.8 (minor m, a=0.107, assigned to CF$_2$CH$_2$Cl), −107.5 to −116 (series of m's, a=4.842), −121.7 to −122.8 and −124 to −127 (m, a=2.492), −143.9 (m, a=1.185). Integration was consistent with 24.4 mol% PSEPVE; end group integration, in combination with the assumption that half the end groups are Cl, was consistent with Mn of ca. 6,800. $^1$H NMR: 6.30 (overlapping t of m's, J=52 Hz, a=1.00, assigned as CF$_2$H), 4.40 (m, a=0.444), 4.17 to 4.00(m, a=0.829), 3.65 to 2.3 (m, a=57.3), 1.8 (m a=0.50, assigned as CF$_2$CH$_3$); integration of hydrogen ends (and assuming an equal number of Cl ends) is consistent with Mn of 5100. Combustion analysis was consistent with Cl(CF$_2$CHr$_2$)$_{19}$(C$_7$F$_{14}$SO$_4$)$_6$H, which corresponds to Mn=3,930.

Found: C, 24.39; H, 0.96; F, 59.64; Cl, 0.90. Calc: C, 24.45; H, 1.00; F, 58.98; Cl, 0.90. TGA showed onset of weight loss at ca. 160° C.

Comparative Example 6

Vinylidene Fluoride/CF$_2$=CFOCF$_2$CF(CF$_3$)OCF$_2$CF$_2$SO$_2$F Cotelomerization in Carbon Dioxide with No Chain Transfer Agent to Yield High MW Polymer A 400 mL Hastelloy autoclave prechilled to <−20° C. was charged with PSEPVE (150 g) and 15 mL of 0.17 M HFPO dimer peroxide. The vessel was closed, evacuated, then further charged with vinylidene fluoride (64 g) and CO$_2$ (150 g), and shaken at room temperature for 18 hr. Excess pressure was released and the viscous residue was analyzed by $^{19}$F NMR (acetone d6) which showed some residual monomer. Estimated conversion of PSEPVE was ca. 60%. The entire sample was devolatilized at 100° C. (0.5 mm) for several hours. Sample was a rather tough rubber, deformable by application of force. Unlike the copolymer sample made using HCl chain-transfer, it did not flow significantly at room temperature under its own weight.

$^{19}$F NMR (acetone d6): +45.5 (s, a=0.91), −77.5 to −79.8 (m, a=7.00), −91 to −95.5 (m, a=4.038), −108 to −115.9 (m, a=4.680), −121.8, −122.3, and −122.8 (series of broadened m's. a=1.651), −124 to −127 (bd m's, a=0.766), −129.5 (s, a=0.0244, assigned to internal CF$_2$ of CF$_3$CF$_2$CF$_2$OCF (CF$_3$)— fragment (end group), −144 (bd m, CF from PSEPVE side chains). Integration was consistent with 24.5 mol % PSEPVE, essentially the same bulk composition as the product of Example 15. Integration of end groups from dimer peroxide fragments as discussed above, and assuming that all ends are of this type gives an estimate of Mn for the copolymer as 106,000. $^1$H NMR showed only broad signal 3.5–2.7.

Example 16

Ionomer Preparation: Preparation of —SO$_3$Li form of VF$_2$/PSEPVE Copolymer Viscous copolymer prepared in Example 15 (25.0 g, 38.5 milliequivalents of sulfonyl fluoride) was transferred to a 1 liter 3-neck flask. Methanol (150 mL) and Li$_2$CO$_3$ (2.81 g) were added and the mixture was stirred for two days. The mixture was filtered, and methanol was removed under reduced pressure to give a glassy foam. Ethylene carbonate (3.52 g, 40 mmol ) and toluene were added and the mixture was heated to remove residual methanol. Flask was returned to the drybox. Residual toluene was poured out, and the copolymer was subjected to high vacuum overnight. The resulting foam was transferred to give 26.0 g. $^1$H NMR (acetone-d6): toluene residue (0.22/H), ethylene carbonate at 4.60 (1.00/H), VF$_2$ signal at 3.65 to 2.8 (6.19/H); triplet of multiplet figure observed at 6.3, J=55 Hz, other coupling ca. 4.5 Hz, assignment=—CF$_2$H. $^{19}$F NMR (acetone-d6): −50.9 and −51.21 (minor singlets, CF$_2$Cl end groups, a=0.0786), −76.5 to −82 (m, a=7.00), −91 to −96 (m, a=3.805), −98 to −100 (a=0.097, assigned to CF$_2$CH$_2$Cl), −107.5 to −116.5 (m's) and −117.2 (overlapping s's, combined a=4.938), −122 to −124 and −125 to −128 (bd, combined a=2.524), −145 (m, a=1.153); calculated mol% PSEPVE=24.2%. The −51 signal corresponds to —CH$_2$CF$_2$Cl ends, integration gives 0.0393/F per end. With the further assumption that half the ends are Cl, the average chain consists of ca. 11 PSEPVE and 34 VF$_2$ fragments, or Mn=ca. 7,100. This is in agreement with $^1$H NMR estimate (ca. 7200).

Example 17

Ionomer Preparation: Preparation of —SO$_2$C(CN)$_2$ Li form of VF$_2$/PSEPVE Copolymer Viscous copolymer prepared in Example 15 (30.5 g, 47.0 mequiv of sulfonyl fluoride) was added to a 3-neck flask and transferred to the drybox. THF (60 mL) was added and the resulting solution was treated with lithium hydride (0.74 g, 93.9 mmol), then slowly with malononitrile (3.10 g, 47 mmol). Gas evolution took place, and temperature rose slowly to 45° C. Mixture became deep red by the time gas evolution was complete. After two days, the mixture was filtered through glass fiber paper in the box, then treated with ethylene carbonate (47 mmol, 4.15 g), and evaporated under vacuum. The resulting foam was treated with toluene (100 mL) and mixed with a spatula. Polymer became taffy-like in consistency. Toluene was poured out and the polymer was washed again with toluene. Residual volatiles were removed under vacuum to give a foam. $^1$H NMR (acetone-d6): showed a trace of toluene (0.51/H), 6.30 (t, CF$_2$H ends, a=0.612), 4.60 (s,ethylene carbonate signal, 4.51/H), 3.65 and 1.78 (THF multiplets, 3.12/H), 3.5–2.4 (VF$_2$ signal, 16.62/H). Assuming that half the end-groups are H, integration indicates that the average chain contains 27 VF$_2$ groups and (from $^{19}$F NMR) 9.1 PSEPVE segments), with a calc'd Mn of 5,800.

What is claimed is:

1. A nonaqueous process for the preparation of polymers, copolymers, oligomers and telomers of one or more vinyl monomers wherein at least one of the vinyl monomers is partially or fully fluorinated comprising the steps of:
   a) contacting said vinyl monomer with a HX chain transfer agent, wherein, X is Cl or Br, to form a nonaqueous polymerization reaction mass;
   b) simultaneously or subsequently further contacting said polymerization reaction mass with a fluoroolefin polymerization initiator; and
   c) reacting said vinyl monomer to yield said polymer, copolymer, oligomer or telomer.

2. The process of claim 1 carried out in a reaction mixture comprising liquid or supercritical carbon dioxide.

3. The process of claim 1 carried out in a reaction mixture comprising fluorocarbons or hydrofluorocarbons.

4. The process of claim 3 wherein the fluorocarbon is CCl$_2$FCF$_2$Cl.

5. The process of claim 3 wherein the hydrofluorocarbon is CF$_3$CFHCFHCF$_2$CF$_3$.

6. The process of claim 1 carried out in a reaction mixture comprising neat vinyl monomer or monomers.

7. The process of claim 1 wherein the vinyl monomer is selected from the group consisting of tetrafluoroethylene (TFE), hexafluoropropylene (HFP), trifluoroethylene, chlorotrifluoroethylene, hexafluoroisobutylene ((CF$_3$)$_2$C=CH$_2$), vinylidene fluoride (VF$_2$), vinyl fluoride, perfluoroalkyl vinyl ethers, perfluoromethyl vinyl ether (PMVE), perfluoroethyl vinyl ether and perfluoropropyl vinyl ether (PPVE), 4,5-difluoro-2,2-bis(trifluoromethyl)-1,3-dioxole (PDD), perfluoro (2-methylene-4-methyl-1,3-dioxolane) (PMD), CF$_2$=CFOCF$_2$CF(CF$_3$)OCF$_2$CF$_2$X, wherein X=—CH$_2$OH (EVEOH), —CH$_2$OPO$_3$H$_2$ (EVEOPO$_3$H$_2$), or —SO$_2$F (PSEPVE), CF$_2$=CF(OCF$_2$CFR)$_a$O(CF$_2$)$_b$(CFR')$_c$SO$_2$F, wherein R and R' are independently selected from the group consisting of F, Cl and a perfluorinated alkyl group having 1 to 10 carbon atoms, a is 0, 1 or 2, b is 0 to 6 and c is 0 or 1; and, as a comonomer with one or more fluorinated monomers, maleic anhydride.

8. The process of claim 1 wherein the amount of chain transfer agent is from 0.0001 to 50 wt % of total monomers loaded.

9. The process of claim 8 wherein the amount of chain transfer agent is from 0.001 to 30 wt % of total monomers loaded.

10. The process of claim 9 wherein the amount of chain transfer agent is from 0.002 to 20 wt % of total monomers loaded.

11. The process of claim 1 conducted at a temperature of from −20° C. to 300° C.

12. The process of claim 11 conducted at a temperature of from 0 to 200° C.

13. The process of claim 12 conducted at a temperature of from 10 to 50° C.

14. The process of claim 1 wherein the polymerization initiator is selected from the group consisting of perfluorinated diacylperoxides, NF$_3$ and hexafluoropropylene oxide (HFPO) dimer peroxide.

15. The process of claim 14 wherein the polymerization initiator is hexafluoropropylene oxide (HFPO) dimer peroxide.

* * * * *